United States Patent [19]

Ikeya

[11] Patent Number: 5,859,730
[45] Date of Patent: Jan. 12, 1999

[54] OPTICAL APPARATUS HAVING A LUMINOUS FLUX SHAPING FILTER

[75] Inventor: Tomoyoshi Ikeya, Nakakoma-gun, Japan

[73] Assignees: Pioneer Electronic Corporation, Tokyo; Pioneer Video Corporation, Yamanashi, both of Japan

[21] Appl. No.: 705,842

[22] Filed: Aug. 30, 1996

[30] Foreign Application Priority Data

Sep. 1, 1995 [JP] Japan .................................. 7-248628

[51] Int. Cl.⁶ .............................. G02B 9/00; G02B 3/02; G11B 7/00
[52] U.S. Cl. ......................... 359/796; 359/719; 359/738; 369/44.23
[58] Field of Search .................................. 359/708–719, 359/668–669, 796, 738, 722–723, 885, 888; 369/44.23, 44.24, 44.37, 116

[56] References Cited

U.S. PATENT DOCUMENTS

| | | | |
|---|---|---|---|
| 4,240,090 | 12/1980 | Hughes et al. ............................ | 357/30 |
| 4,341,473 | 7/1982 | Mast ......................................... | 359/888 |
| 5,159,491 | 10/1992 | Richards .................................. | 359/719 |
| 5,499,262 | 3/1996 | Nakata ..................................... | 359/719 |
| 5,629,808 | 5/1997 | Powell ..................................... | 359/719 |

*Primary Examiner*—Georgia Yvonne Epps
*Assistant Examiner*—Jordan M. Schwartz
*Attorney, Agent, or Firm*—Finnegan, Henderson, Farabow, Garrett & Dunner, L.L.P.

[57] ABSTRACT

An optical apparatus including a luminous flux shaping filter for converting a shape of an incident beam without bending an optical path of the incident beam. A light beam emitted from a focusing laser source comprising a semiconductor laser is converted into a parallel light beam by a collimator lens, and then enters the luminous flux shaping filter. The luminous flux shaping filter is positioned on an optical path in the apparatus in the manner that a major axis of an oval light beam from the collimator lens is perpendicular to a longitudinal area in which the transmittance is the highest in the filter. As a result, the luminous flux shaping filter converts the oval light beam into a substantially circular light beam without bending an optical path of the light beam.

2 Claims, 5 Drawing Sheets

5,859,730

OPTICAL APPARATUS HAVING A LUMINOUS FLUX SHAPING FILTER

FIELD OF THE INVENTION

This invention relates to an optical apparatus, in particular to an optical apparatus in which a light source includes a semiconductor laser.

BACKGROUND OF THE INVENTION

A conventional recorder for an optical master disk comprises two optical systems i.e. a fixed optical system and a movable optical system, and needs a large recording light source such as a gas laser. Accordingly, in the recorder, the fixed optical system is separated from the movable optical system.

However, the development of a semiconductor laser and the combination of a non-linear optical element with the semiconductor laser enable a recording light source to be miniaturized. Therefore, this has allowed the movable optical system to accommodate the fixed optical system.

In general, a semiconductor laser tends to emit a light beam which diverges at different angles from a junction. As a result, the divergence angle parallel to the junction is different from the divergence angle orthogonal to the junction, so that the laser provides a light beam having an oval shape in a cross section. Therefore, it is necessary to pass the light beam through a shaping prism to correct the shape of the light beam.

FIG. 1 shows one example of a shaping prism. The shaping prism 3 is made from a material having a predetermined refractive index into a predetermined shape. If a light beam having an oval shape enters the prism 3, the prism 3 functions to convert the oval shape of the light beam into a substantially circular shape.

However, when the light beam passes through the prism, the prism converts the shape of the beam, and simultaneously results in bending an optical path of the beam at a predetermined angle. Accordingly, the bending of the optical path causes the recorder to increase the length of the optical path and its size.

OBJECTS OF THE INVENTION

An object of the invention is to provide a luminous flux shaping filter which functions to convert a shape of a light beam without bending its optical path.

A further object of the invention is to provide an optical apparatus wherein the overall length of an optical path is shortened and the structure is compact.

SUMMARY OF THE INVENTION

The foregoing and other problems are overcome and the objects of the invention are realized by an optical apparatus comprising: an optical path for passing a luminous flux having a predetermined shape therethrough; and a luminous flux shaping filter located in the optical path, said luminous flux shaping filter having a specific transmittance characteristic wherein the transmittance of an area adjacent a virtual line passing perpendicularly to and through an optical axis in said luminous flux shaping filter is the highest, and the transmittance is decreased in accordance with the distance from said virtual line.

The luminous flux is an oval shape beam which has an oval shape in a cross section perpendicular to the optical axis, and is emitted from a semiconductor laser, and the luminous flux filter is positioned in the optical path in the manner that a major axis in the oval shape beam is orthogonal to the virtual line.

The luminous flux shaping filter comprises a transparent substrate having a uniform thickness and a translucent layer formed on a main surface of the substrate, wherein the thickness of an area adjacent the virtual line is the thinnest, the more the distance from the virtual line in the translucent layer increases, the more the thickness of the translucent layer increases.

In a preferred embodiment of the present invention, an optical apparatus comprises a focusing light source consists of a semiconductor laser. In this case, when an oval light beam emitted from the laser enters a luminous flux shaping filter, the luminous flux shaping filter converts a shape of the oval light beam into a substantially circular light beam without bending an optical path of the light beam. As a result, the overall length of an optical path in the apparatus is shortened, so that the apparatus is constructed in a compact size.

BRIEF EXPLANATION OF THE DRAWINGS

The aforementioned aspects and other features of the invention are explained in the following description, taken in connection with the accompanying drawing figures, wherein.

DESCRIPTION OF THE PREFERRED EMBODIMENTS

Figure 1:
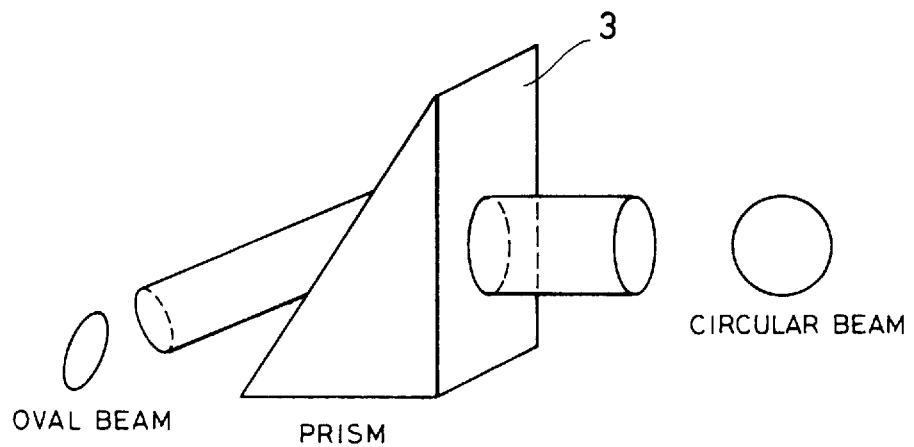
FIG. 1 is a perspective view showing a conventional prism which functions to convert an oval beam shape into a circular beam shape.
Figure 2A:
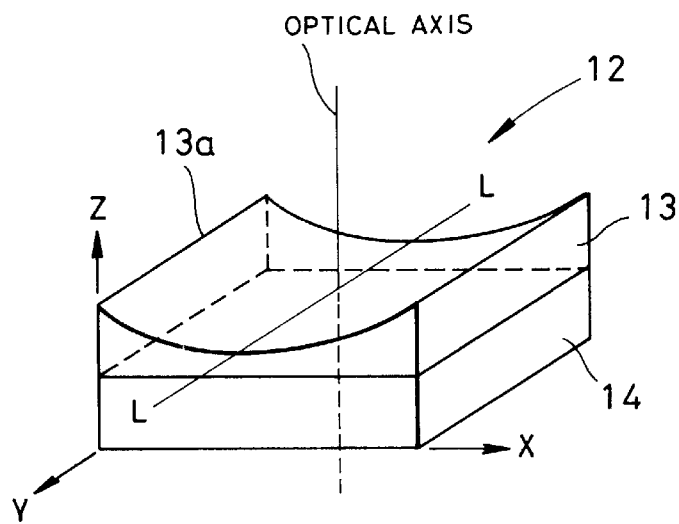
FIG. 2A is a perspective view showing a luminous flux shaping filter according to the present invention.
Figure 2B:
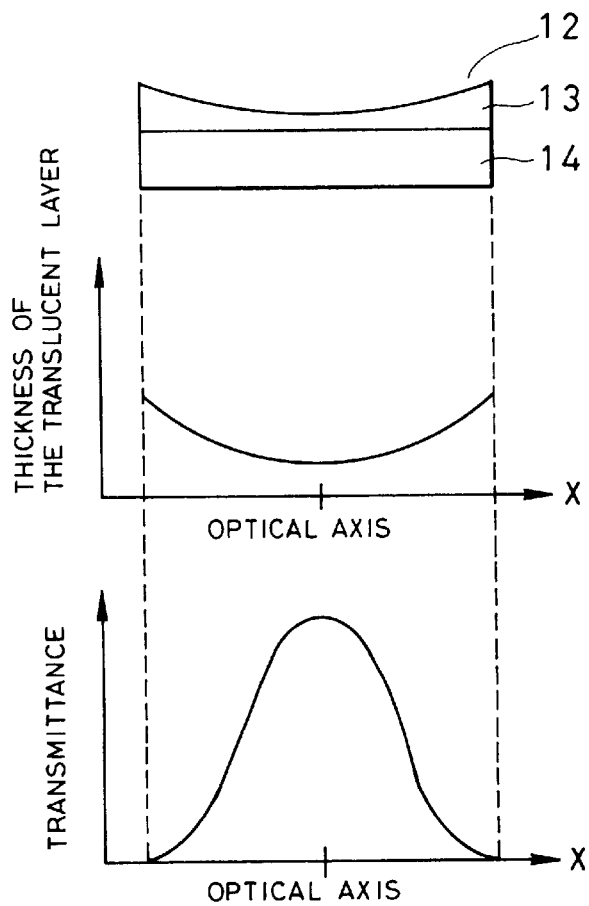
FIG. 2B illustrates the thickness and transmittance distributions of the translucent layer in the filter of FIG. 2A.
Figure 3:
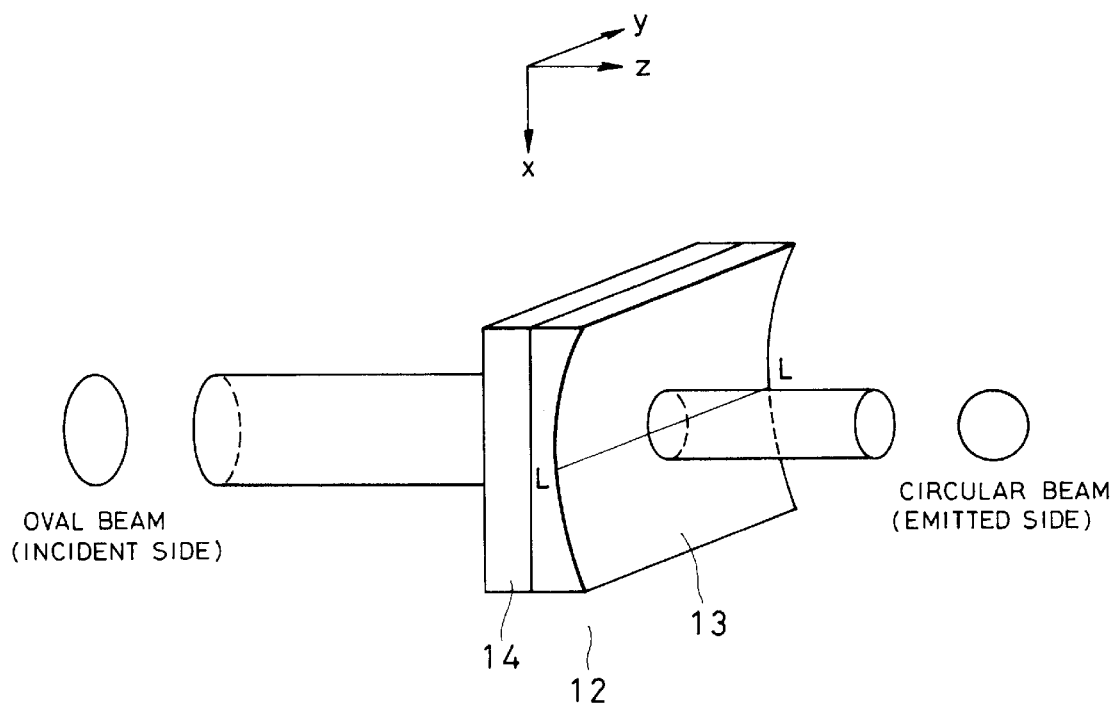
FIG. 3 illustrates the diagrammatic operation of the filter of FIG. 2A.

FIGS. 2A and 2B illustrate a preferred embodiment of a luminous flux shaping filter according to the present invention. Referring to FIGS. 2A and 2B, a detailed description is now made for illustrating the luminous flux shaping filter. It is noticed that identically labeled elements appearing in different ones of the figures refer to the same element in the different figures but may be not be referenced in the description for all figures.

FIG. 2A shows a perspective view of a luminous flux shaping filter 12. The luminous flux shaping filter 12 comprises a plane glass substrate 14 having a uniform thickness and a translucent layer 13 formed on a main surface of the glass substrate 14. The translucent layer 13 is made by evaporating a metallic material such as aluminum (Al) or chromium (Cr) on the main surface of the glass substrate 14.

As shown in FIG. 2A, coordinates is set for the shaping filter 12 in such a manner that a direction of the thickness of the filter, which is parallel to an optical axis in the filter 12, is coincident with the z-axis, and an orthogonal surface to the optical axis is coincident with the x-y plane.

The translucent layer has the thinnest thickness in a narrow width area adjacent a virtual line "L—L" (which extends parallel to the y-axis) extending perpendicularly to and through an optical axis of the shaping filter, and the increase of the distance from the virtual line "L—L" results in the increase of the thickness of the translucent layer 13. Thus, the translucent layer 13 has a surface of a cylindrically concave shape.

In a preferred embodiment, the area adjacent the virtual line "L—L" in the translucent layer 13 has the thickness within the range of 0 Å to ~10 Å, and an area adjacent the outer edges 13a of the layer 13 which is far away from the virtual line "L—L" has the thickness within the range of ~$10^2$ Å.

FIG. 2B illustrates the transmittance characteristic of the luminous flux shaping filter 12. In the shaping filter 12, the transmittance in the narrow width area adjacent the virtual line "L—L" is the highest, the more the distance from the line "L" increases, the lower the transmittance is.

A description is made for the operation of the luminous flux shaping filter 12. When an oval beam which consists of parallel light rays and has a major axis orthogonal to the virtual line "L—L" impinges on the filter 12 as an incident beam, the major axis of the beam is shortened by passing through the filter. As a result, the beam acquires a substantially circular shape, and then is emitted from the filter.

In this case, the suitable selection of the combination of the ratio of the major and minor axes in the section of the incident beam, and the thickness distribution of the translucent layer 13 in the filter 12 allows the beam shape to become circular. That is, the filter 12 make a light beam from a semiconductor laser convert into a circular beam.

In a preferred embodiment, the translucent layer 13 is made of Al or Cr by using evaporation technique. However, instead of evaporation, it should be understood that metallic particles such as Al or Cr particles are painted on a glass substrate by mixing the metallic particles with a solvent to form a translucent layer with the above thickness distribution.

Figure 4A:
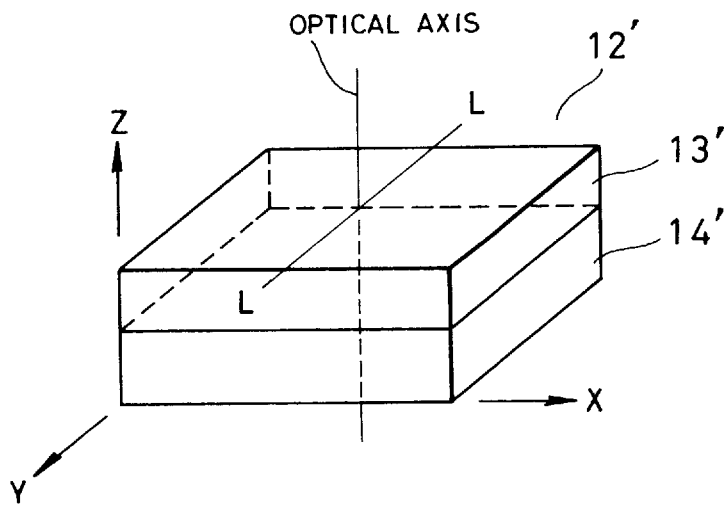
FIG. 4A is a perspective view showing another preferred embodiment of a luminous flux shaping filter according to the invention.
Figure 4B:
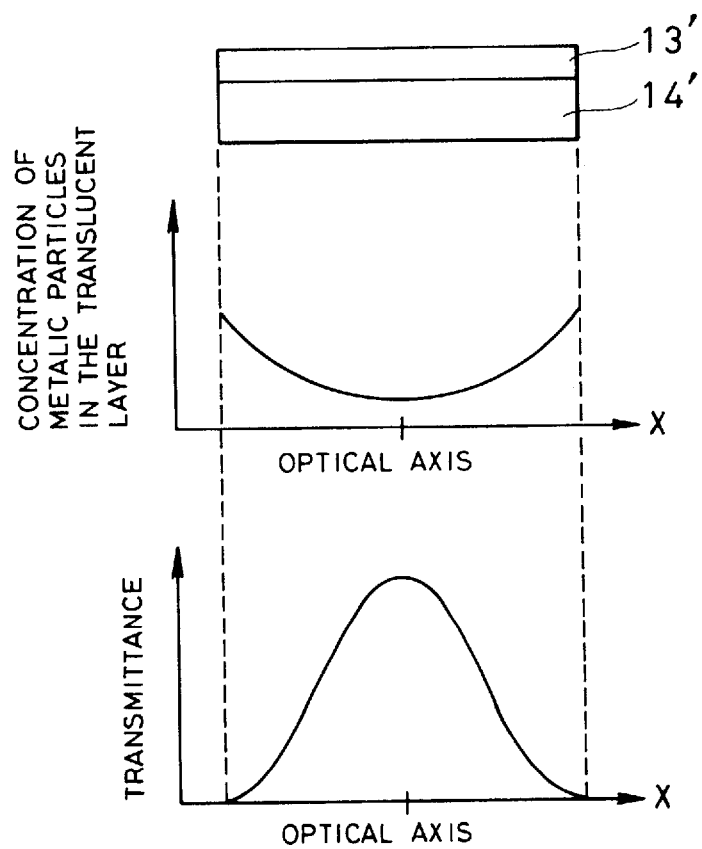
FIG. 4B illustrates the concentration and transmittance distributions of the translucent layer in the filter of FIG. 4A.

Instead of the metallic particles, a light absorptive material may be painted on a glass substrate to form a translucent layer 13. FIGS. 4A and 4B illustrate another embodiment of a luminous flux shaping filter according to the invention. Referring to FIG. 4A, a luminous flux shaping filter 12' comprises a plane glass substrate 14' having a uniform thickness and a translucent layer 13' formed on a main surface of the glass substrate 14'. As shown in FIG. 4A, coordinates is set for the shaping filter 12' in such a manner that an optical axis in the filter 12 i.e. a thickness direction is coincident with the z-axis, and an orthogonal surface to the optical axis is coincident with the x-y plane.

The translucent layer 13' includes metallic particles such as Al or Cr particles, and has a uniform thickness over the one of main surfaces of the glass substrate 14'. The translucent layer 13' is formed by painting with a specific concentration distribution of the metallic particles. In the translucent layer 13', a narrow width area adjacent a virtual line "L—L" (which extends parallel to the y-axis) which extends perpendicularly to and through an optical axis of the filter has the lowest concentration, the increase of the distance from the virtual line "L—L" results in the increase of the concentration of the metallic particles. As a result, the transmittance of the narrow width area adjacent the virtual line "L—L" becomes highest, the more the distance from the virtual line "L—L" increases, the lower the transmittance of the translucent layer becomes.

Figure 5:
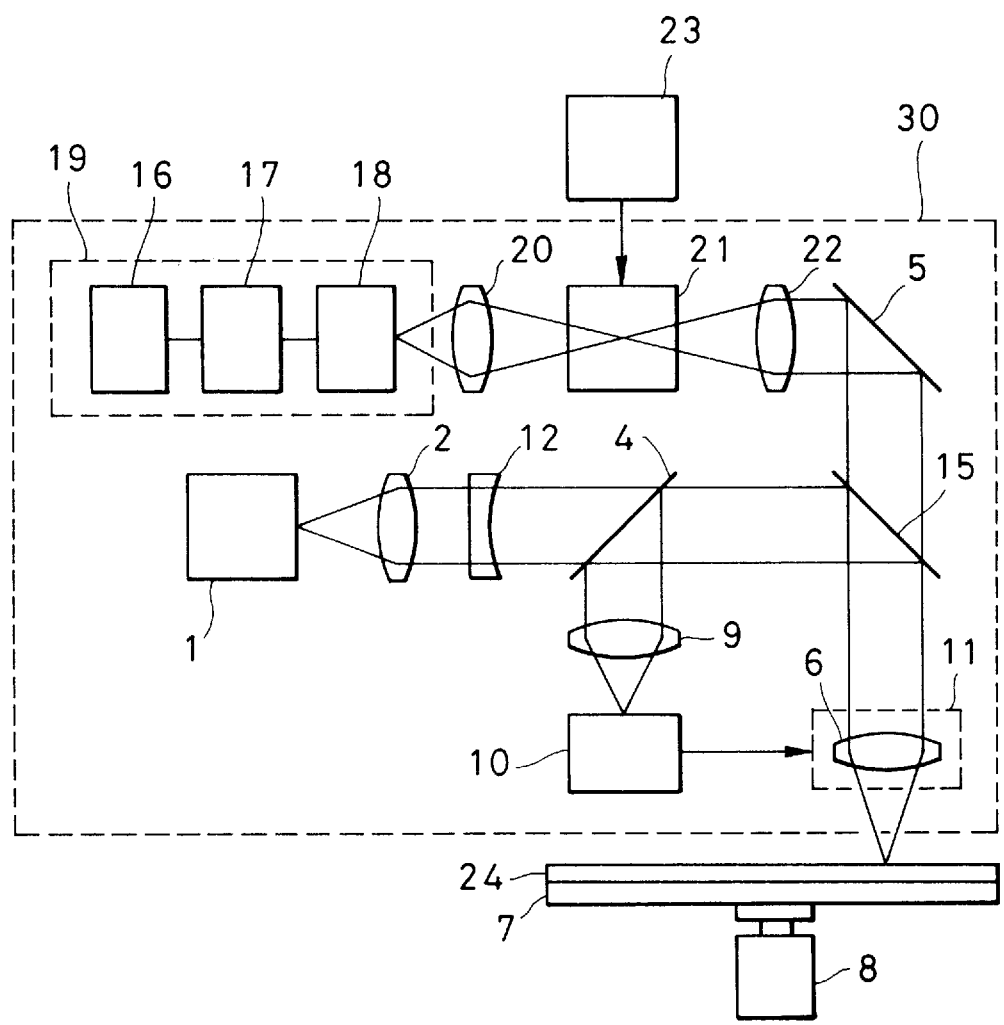
FIG. 5 is a block diagram of a recorder for an optical master disk, which comprises a luminous flux shaping filter according to the present invention.

FIG. 5 shows one preferred embodiment of an optical apparatus including a luminous flux shaping filter 12 according to the present invention. In the preferred embodiment, the optical apparatus consists of optical master disk recorder which includes a movable optical system 30 including a focusing controller, and a recording optical system provided within the movable optical system 30.

In FIG. 5, a light beam emitted from a focusing laser beam source 1 including a semiconductor laser is converted into a parallel luminous flux by a collimator lens 2. The laser beam is emitted from a junction in the semiconductor laser 1, diverging parallel to the junction and perpendicular to the junction at different angles, respectively. Therefore, the laser beam from the laser 1 has an oval shape in a cross section.

In order to correct a beam shape, the light beam has to be passed through a luminous flux shaping filter 12. The luminous flux shaping filter 12 is located on an optical path in such a manner that a major axis in the oval light beam from the collimator lens 2 is orthogonal to the virtual line in the luminous flux shaping filter 12. As a result, the oval light beam is converted into a substantially circular light beam to pass through the shaping filter 12 without bending an optical path of the light beam.

The circular light beam from the shaping filter 12 passes through a beam splitter 4, and is then reflected by a dichroic mirror 15. The light beam reflected by the dichroic mirror 15 is focused by an objective lens 6 on an optical mater disk 7, and then impinges on a recording surface of the optical master disk 7, which is rotated by a motor 8 at a predetermined revolutions per minutes, to form a microspot with a predetermined beam radius on the recording surface.

The light beam is then reflected by the recording surface in the optical master disk 7, and passes through the objective lens 6. The light beam passing through the objective lens 6 is reflected by the dichroic mirror 15, and is then reflected by the beam splitter 4. The light beam reflected by the beam splitter 4 is gathered by a condenser lens 9, and enters a photodetector 10.

The photodetector 10 includes a cyrindorical lens (not shown), four quadrant detectors, and an operating circuit, so that the photodetector 10 can generate a control signal which corresponds to a focus error signal in accordance with the amount of the received light beam to supply the control signal to an actuator 11, thereby providing an accurate focusing control.

Referring to FIG. 5, again, a recording light source 19 comprises a semiconductor laser 16, a second harmonic generating element (designated as a SHG element hereinafter) 17, and a filter 18.

A light beam from the semiconductor laser 16 enters the SHG element 17. The SHG element 17 receives an incident beam to generate a second harmonic wave of the incident beam, thereby outputting a laser beam having a wavelength of $\lambda$; 420 nm which corresponds to a half of the incident beam having a wavelength of $\lambda$; 840 nm. The filter 18 extracts only the second harmonic wave, so that the recording light source 19 can emit only a light beam having the wavelength of $\lambda$; 420 nm. The SHG element 17 is one of non-linear optical elements, and a light beam from the recording light source 19 including the filter 18 has a circular shape.

The light beam emitted from the recording light source 19 is gathered with a condenser lens 20, and then is converted into a parallel light beam with a collimator lens 22.

An acoustooptic modulator (designated as A/O modulator hereinafter) 21 is located on a focus point of the condenser lens 20 between the condenser lens 20 and the collimator lens 22. When a supersonic driving voltage is applied to a piezoelectric material in the A/O modulator 21, the A/O modulator 21 produces a compressional wave having a micro wavelength in a medium. When the compressional wave generated in the A/O modulator 21 is used as a grating element, and is interacted with the light beam from the recording light source, an acoustooptic reflection is induced. Because the reflected light beam (diffracted light) is changed in accordance with the applied supersonic driving voltage, the amplitude modulation of the supersonic driving voltage produces a modulated light beam.

Accordingly, an acoustooptic driving circuit 23 supplies the A/O modulator 21 with a modulated signal corresponding to a recording signal being recorded on an optical master disk 7, so that the light beam is light-modulated in accordance with the recording signal.

The light beam light-modulated with the A/O modulator 21 is converted into a parallel light beam by the collimator lens 22, and then passes through a reflecting mirror 5 and the dichroic mirror 15. The light beam from the dichroic mirror 5 is focused with the objective lens 6 to irradiate a surface of the optical master disk 7.

The optical master disk 7 has a mirror grinded surface made of glass, which is covered with a photoresist layer 24. The light beam impinging on the optical master disk is light-modulated by the A/O modulator 21 in accordance with the time-length of an irradiating period corresponding to information of music and/or video being recorded. The photoresist layer 24 on the optical master disk 7 which is rotated at a predetermined speed by a motor 8 is irradiated with the light beam light-modulated.

The light-modulated light beam is moved from an internal area of the rotating optical master disk 7 toward an external area thereof, by moving the optical system 30 in the radius direction of the optical master disk 7 by a predetermined distance step by step. Thus, the photoresist layer is exposed by the modulated light beam, so that recording signals can be transferred to the optical master disk. After that, the optical disk master is developed, and the surface of the optical disk is then metal-evaporated, so that the optical master disk has been manufactured.

The optical disk master has a plurality of pit-rows on the surface, each of which consisting of a plurality of concave or convex pits with the length corresponding to information signals of music or video.

A nickel plate stamper is formed by plating the surface of the optical master disk with nickel, and removing a nickel layer from the surface of the optical master disk. An optical disk can be made by using the nickel plate stamper.

It should be noticed that a luminous flux shaping filter according to the present invention can be applicable to an optical information reproducing apparatus and an optical information recording/reproducing apparatus, thereby providing the similar effective advantages to the above embodiment.

It also should be understood that a luminous flux shaping filter according to the present invention may be used in order to change a shape of a divergent or focused beam.

It further should be noticed that a luminous flux shaping filter according to the present invention may be used in order to convert a circular beam to an oval beam, and that the present invention does not give any limitation to how to use a filter of the invention or where a filter of the invention is used.

While the invention has been particularly shown and described with respect to preferred embodiments of the invention, it will be understood by those skilled in the art that changes in form and details may be made therein without departing from the spirit and scope of the disclosed invention. Thus, it should be appreciated that the invention is not limited to the disclosed embodiments but may be practiced within the full scope of the appended claims.

What is claimed is:

1. An optical apparatus, comprising:

a light source for providing an optical path for passing a luminous flux having a predetermined shape therethrough; and a luminous flux shaping filter located in the optical path, said luminous flux shaping filter having a specific transmittance distribution, said transmittance distribution having the highest transmittance in an area adjacent to a virtual line passing perpendicularly to and through an optical axis in said luminous flux shaping filter, and the transmittance being decreased in accordance with the distance from said virtual line, wherein said luminous flux shaping filter comprises a transparent substrate having a primary surface, a secondary surface and a uniform thickness, and a translucent layer formed on said primary surface of said substrate, said translucent layer including opaque particles wherein the opaque particle concentration of an area adjacent said virtual line in the translucent layer is the lowest, the distance from the virtual line increasing as opaque particle concentration in the translucent layer increases.

2. A luminous flux shaping filter comprising:

a transparent substrate having a primary surface, a secondary surface and a uniform thickness; and a translucent layer formed on said primary surface of said substrate, said translucent layer including a plurality of opaque particles, wherein the particle concentration in an area adjacent a virtual line, passing perpendicularly to and through an optical axis in the translucent layer is the lowest, the distance from said virtual line in the translucent layer increasing as the particle concentration in the translucent layer increases, and wherein the transmittance of said area in said luminous flux shaping filter is the highest, and the transmittance is decreased in accordance with the distance from said virtual line.

* * * * *